United States Patent [19]
Berding

[11] Patent Number: 5,936,803
[45] Date of Patent: Aug. 10, 1999

[54] DISK DRIVE HAVING A MASS BALANCED HEAD GIMBAL ASSEMBLY

[75] Inventor: Keith R. Berding, San Jose, Calif.

[73] Assignee: Western Digital Corporation, Irvine, Calif.

[21] Appl. No.: 08/870,617

[22] Filed: Jun. 6, 1997

[51] Int. Cl.$^6$ ....................................................... G11B 5/58
[52] U.S. Cl. ............................................................. 360/104
[58] Field of Search .................................... 360/104, 105, 360/106, 109

[56] References Cited

U.S. PATENT DOCUMENTS 4,980,787  12/1990  Iwanaga .................................... 360/106
5,060,099  10/1991  Yaeger et al. ............................ 360/105

*Primary Examiner*—George J. Letscher
*Attorney, Agent, or Firm*—Leo J. Young; Milad Shara

[57] ABSTRACT

The invention resides in a magnetic disk drive having a load beam assembly that forms a part of a head gimbal assembly and head stack assembly in a magnetic disk drive.

The load beam assembly is uniquely mass balanced to prevent head slap by preventing an acceleration in the Z-direction from causing the transducer head to separate from the disk. The load beam assembly is preferably mass balanced by providing a load beam balancing member that is rigidly connected to the elongated load beam about a transverse axis of the hinge member. The balancing member can form the balancing mass or the balancing member can carry a discrete balancing mass. The balancing member may be divided into two halves that move on either side of the base portion, but is preferably comprised of a narrow, centrally located member that moves within an aperture formed in the base portion. The mass balanced load beam assembly can beneficially be manufactured from the same stainless steel sheets used to form conventional load beam assemblies. The balancing member may also be flexibly connected to the load beam by a spring hinge having a spring constant which, in concert with the mass of the balancing member, makes the balancing member oscillate in opposition to the disk to actively bias the head against the disk following a shock event.

28 Claims, 8 Drawing Sheets

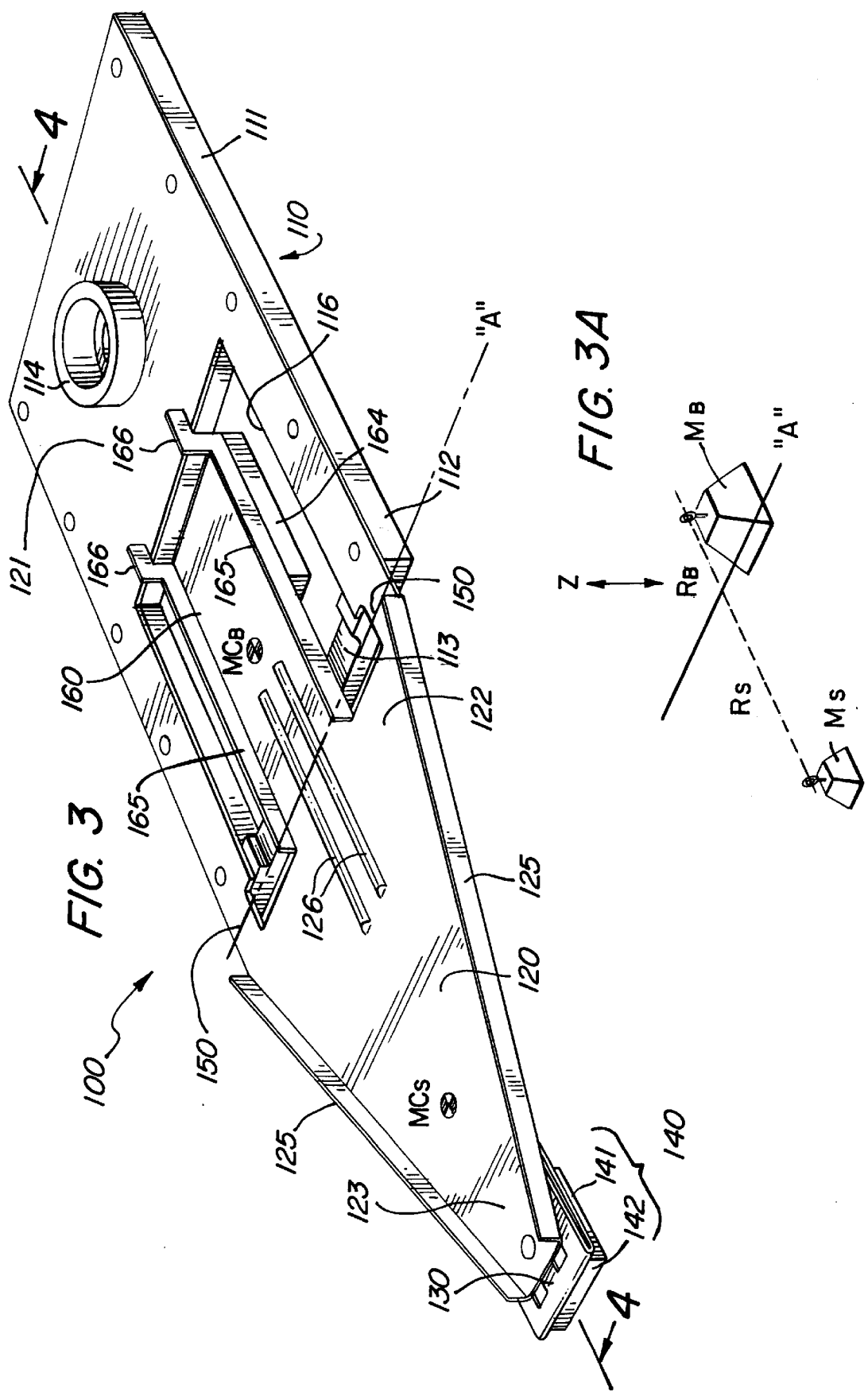

$M_s R_s = M_{B1} R_{B1} + M_{B2} R_{B2}$

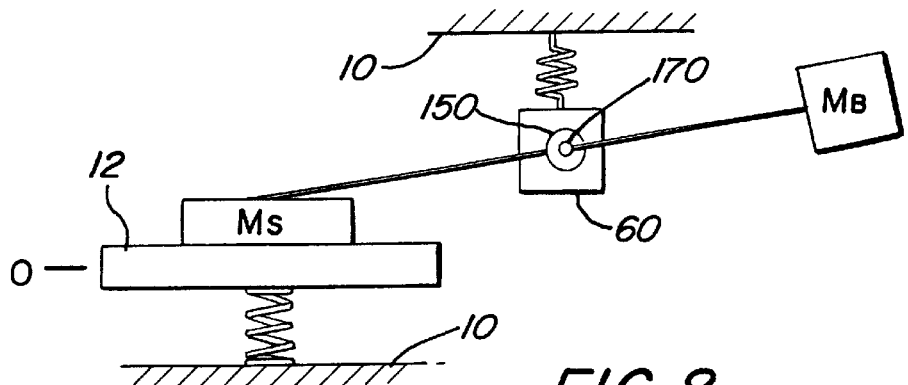
FIG. 8
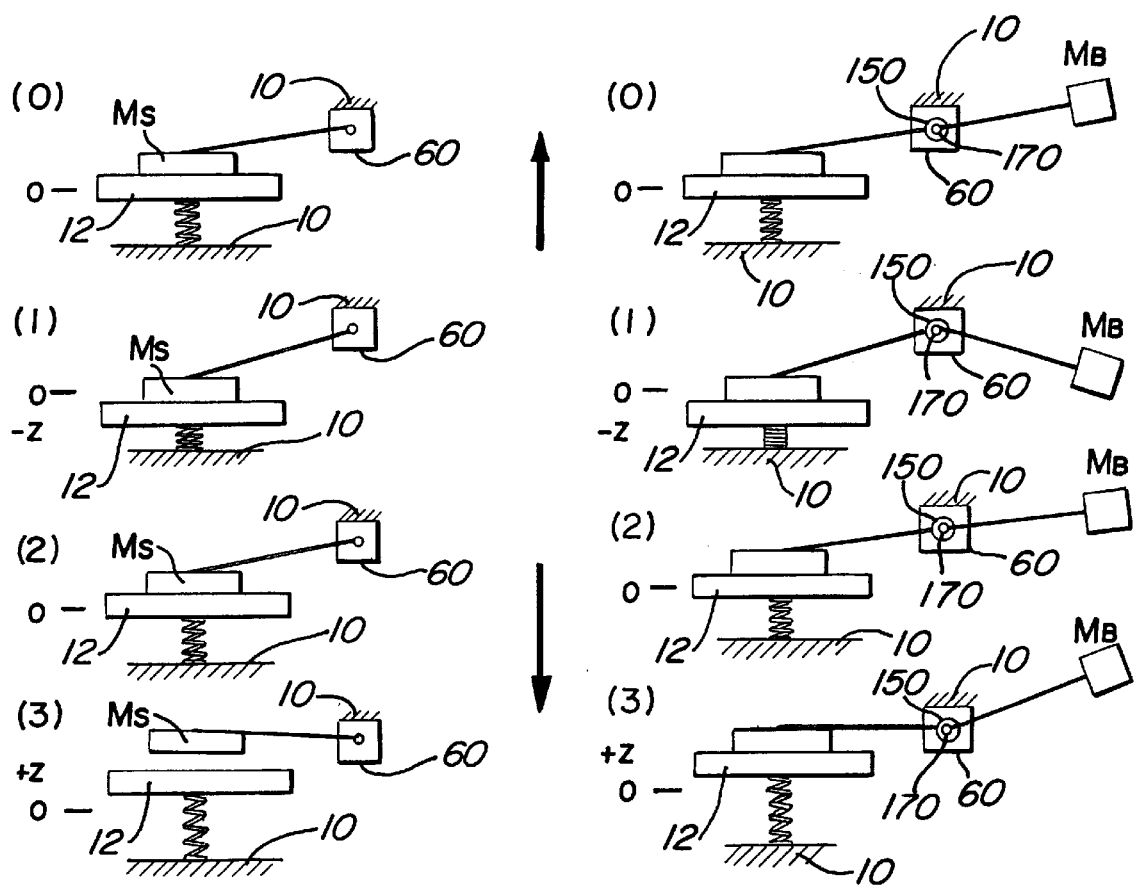
FIG. 8A
PRIOR ART
FIG. 8B

TUNED HINGE
STIFFNESS = $K_B$ (AT MASS CENTER)
$f = \frac{1}{2\pi} \sqrt{\frac{K_B}{M_B}}$
= DISK FREQUENCY

DISK DRIVE HAVING A MASS BALANCED HEAD GIMBAL ASSEMBLY

BACKGROUND OF THE INVENTION

1. Field of the Invention

The present invention relates generally to a rotating magnetic storage disk drive and, more particularly, to a disk drive having a mass balanced load beam assembly which forms part of a head gimbal assembly ("HGA") in a head stack assembly ("HSA") in such a disk drive and reduces the possibility of "head slap" due to mechanical shock.

2. Description of Related Art

A conventional disk drive has a head disk assembly including at least one magnetic disk ("disk"), a spindle motor for rapidly rotating the disk, and a Head Stack Assembly ("HSA") that includes a transducer head carried by a slider (collectively a "head") for reading and writing data. The head stack assembly is controllably positioned by a servo system in order to read or write information on the disk. The typical head stack assembly has two primary portions: (1) an actuator assembly that moves in response to the servo control system and (2) a head gimbal assembly ("HGA") that extends from the actuator assembly and biases the head towards the disk.

The industry presently prefers a "rotary" actuator assembly including an actuator body that rotates on a pivot assembly, a coil that extends from one side of the actuator body to interact with a pair of permanent magnets to form a voice coil motor for moving the actuator body, and an actuator arm that extends from an opposite side of the actuator body to support the head gimbal assembly.

The conventional HGA includes a suspension assembly, an electrical interconnect means such as wires, and a head. The suspension assembly itself comprises a base plate, a load beam and a gimbal. The base plate rigidly connects a base portion of the load beam to the actuator arm. The load beam has a hinge end that pivotally connects to the actuator arm and a gimbal end that connects to the gimbal which carries the head. The load beam transmits a biasing force known as a gram load to the head to "load" it against the disk.

A rapidly spinning disk develops a laminar air flow above its surface which, because of the characteristics of the slider, lifts the head away from the disk in opposition to the gram load biasing force. The head is said to be "flying" over the disk when in this state. The load beam assembly has a spring function which provides the gram load biasing force or "pre-load," and a hinge function which defines a pivot axis and permits the head, supported by the gimbal, to follow the surface contour of the spinning disk.

The conventional HGA is unbalanced in that most of its mass is located distal to the pivot axis. Disk drives using conventional HGAs have long been plagued by product failure due to "head slap," the phenomenon that occurs when the acceleration due to mechanical shock to the drive acts on the unbalanced mass of the HGA, exceeds the pre-load, and causes the head to separate from and subsequently impact the disk surface. This impact between the disk and the sharp corners of the slider can damage the disk, corrupt the data stored in that area, and even cause catastrophic tribological failure.

Head slap can occur during the disk drive manufacturing process, during transport, during assembly into computer systems, or during the use of those systems. Head slap can also occur in some drives in which a "tang" extending from the actuator coil slams into a limiting mechanism or "crash stop" during normal power down operation.

In addition, disk drives designed for the mobile computing market must be able to withstand the abuse imparted to portable computers. This is especially important for drives designed to be removable storage devices. Removable drives can easily be subjected to significant shock G forces even when dropped only a few inches onto a hard surface.

Prior efforts to reduce the head slap problem have included trying to keep the head from leaving the disk surface by increasing the G level threshold needed to cause separation and trying to minimize the damage after separation occurs. Typical efforts have included:

Decreasing the effective mass of the suspension and slider by decreasing suspension length, width, material thickness, material composition, etc.;

Increasing the pre-load biasing force;

Moving the center of mass toward the hinge by narrowing the load beam assembly as it approaches the slider;

Increasing the robustness of the disk surface by using glass substrates, hydrogenated carbon or other tough overcoats, or both;

Radiusing the corners and edges of the air bearing surface and sides of the slider that may contact the surface of the disk; and Adding stops that limit the separation between the slider and disk to reduce the impact force without reducing the ease with which the slider leaves the disk in the first place.

While these are improvements, an examination of industry literature and quality reports indicates that head slap is still the number one cause of HDA failure in the field. There is a significant need, therefore, for a head gimbal assembly in a disk drive that further reduces the likelihood of head slap.

SUMMARY OF THE INVENTION

The invention resides in a magnetic disk drive having a disk and a head stack assembly, the head stack assembly having a coil, an actuator body, an actuator arm, and a head gimbal assembly. The head gimbal assembly comprises a transducer head, a gimbal means for supporting the head, electrical interconnect means for carrying signals to and from the transducer head, and a mass balanced load beam assembly providing a unique structure which reduces the effects of shock events causing "head slap" in the disk drive. The mass balanced load beam assembly includes a base portion having a base actuator end joined to the actuator arm, and a base hinge end. The load beam assembly further comprises a hinge means defining a transverse axis, an elongated load beam having a load beam hinge end joined to the base hinge end via the hinge means, and a load beam balancing member connected to the load beam about the transverse axis of the hinge means and extending to an opposite side thereof toward the base portion.

In another aspect of the invention, the load beam and attached components form a suspension mass $M_S$ with a suspension mass center that is at a distance $R_S$ from the transverse axis while the balancing member forms a balancing mass $M_B$ having a balancing mass center that is a distance $R_B$ from the transverse axis. The load beam assembly preferably comprises means for rigidly connecting the balancing member to the load beam.

In a preferred embodiment, $M_B*R_B$ is substantially equal to $M_S*R_S$ so that an acceleration of the transducer head in the Z-direction normal to a disk surface is less likely to cause a head disk separation because the torque generated by the balancing mass $M_B$ at a distance $R_B$ from the transverse axis substantially counteracts a torque generated by the suspension mass $M_S$ at distance $R_S$ from the transverse axis.

In another embodiment, MB*RB MS*RS so that an acceleration in a particular Z-direction normal to a disk surface biases the transducer head against a disk surface in opposition to the acceleration.

In another embodiment, the magnetic disk drive includes a means for flexibly connecting the load beam balancing member to the load beam. The means for flexibly connecting the balancing member further comprises a spring constant selected to provide a restoring force that oscillates in phase with the disk during a shock event and helps to keep the head biased towards the disk. The flexibly connected load beam balancing member further preferably comprises a means for damping the balancing member so that it damps out at substantially the same rate as the disk following a shock event.

The invention can be regarded as a mass balanced load beam assembly comprising a base portion having a base actuator end and a base hinge end; a hinge means defining a transverse axis; an elongated load beam having a load beam hinge end and a load beam gimbal end, the load beam hinge end joined to the base hinge end via the hinge means; a gimbal means for supporting the transducer head, the gimbal means being attached to the load beam gimbal end; and a load beam balancing member rigidly connected to the load beam about the transverse axis of the hinge means and extending to an opposite side thereof toward the base portion.

The invention can also be regarded as a mass balanced head stack assembly comprising an actuator body having a pivot axis, a motive means for swinging the actuator body about the pivot axis, a plurality of arms cantilevered from the actuator body, a plurality of mass balanced load assemblies, load beam balancing member may be rigidly connected to the load beam with a rigid connecting means such as ribs and rails. Alternatively, the balancing member may cooperate with a flexible connecting means of a given spring constant $K_B$ so that the balancing member and flexible connecting means for a mass tuned damper that opposes the response oscillations of the disk and actively tends to keep the head on the disk.

The balancing member may take on several forms, but the preferred balancing member is narrow and centrally located.

BRIEF DESCRIPTION OF THE DRAWINGS

The just summarized invention can be best understood with reference to the following description taken in view of the drawings of which:

FIG. 3 is a perspective view of the preferred mass balanced head gimbal assembly 100 according to the present invention;

FIG. 3A is a schematic diagram corresponding to the mass balanced HGA 100 of FIG. 3 showing that balance is achieved with unequal suspension and balancing mass centers $M_S$, $M_B$ that are located at inversely proportional distances $R_S$, $R_B$ from the pivot axis "A" so that $M_S*R_S=M_B*R_B$;

FIG. 8 is a simplified mass-spring diagram of the disk drive wherein the balancing mass $M_B$ is suspended by a spring hinge 170 that is substantially coaxial with the spring hinge 150 supporting the suspension mass $M_S$ (see FIG. 12) and showing the dynamic relationship between the suspension mass $M_S$, the balancing mass $M_B$, the spring hinges 150, 170, the disk 12, and the actuator arm 60 where the latter two elements may move relative to the remainder of the disk drive 10;

FIG. 8A is simplified mass-spring diagram showing the system dynamics of a drive having a conventional HGA where the arm 60 is assumed to make a rigid body connection to the remainder of the drive 10 and where a shock event that causes an upward acceleration makes the system cycle through positions (0), (1), (2), (3), (0), (1), etc. . . . ; where a shock event that causes a downward acceleration makes the system cycle through positions (2), (3), (0), (1), (2), (3), etc. . . . ; and illustrating the head-disk separation that may occur at position (3);

FIG. 8B is a simplified mass-spring diagram showing the system dynamics of a drive having a mass balanced HGA according to the present invention where the arm 60 is assumed to make a rigid body connection to the remainder of the drive 10 and where a shock event that causes an upward acceleration makes the system cycle through positions (0), (1), (2), (3), (0), (1), etc. . . . and where a shock event that causes a downward acceleration makes the system cycle through positions (2), (3), (0), (1), (2), (3), etc. . . . ;

DETAILED DESCRIPTION OF THE PREFERRED EMBODIMENTS

Figure 1:
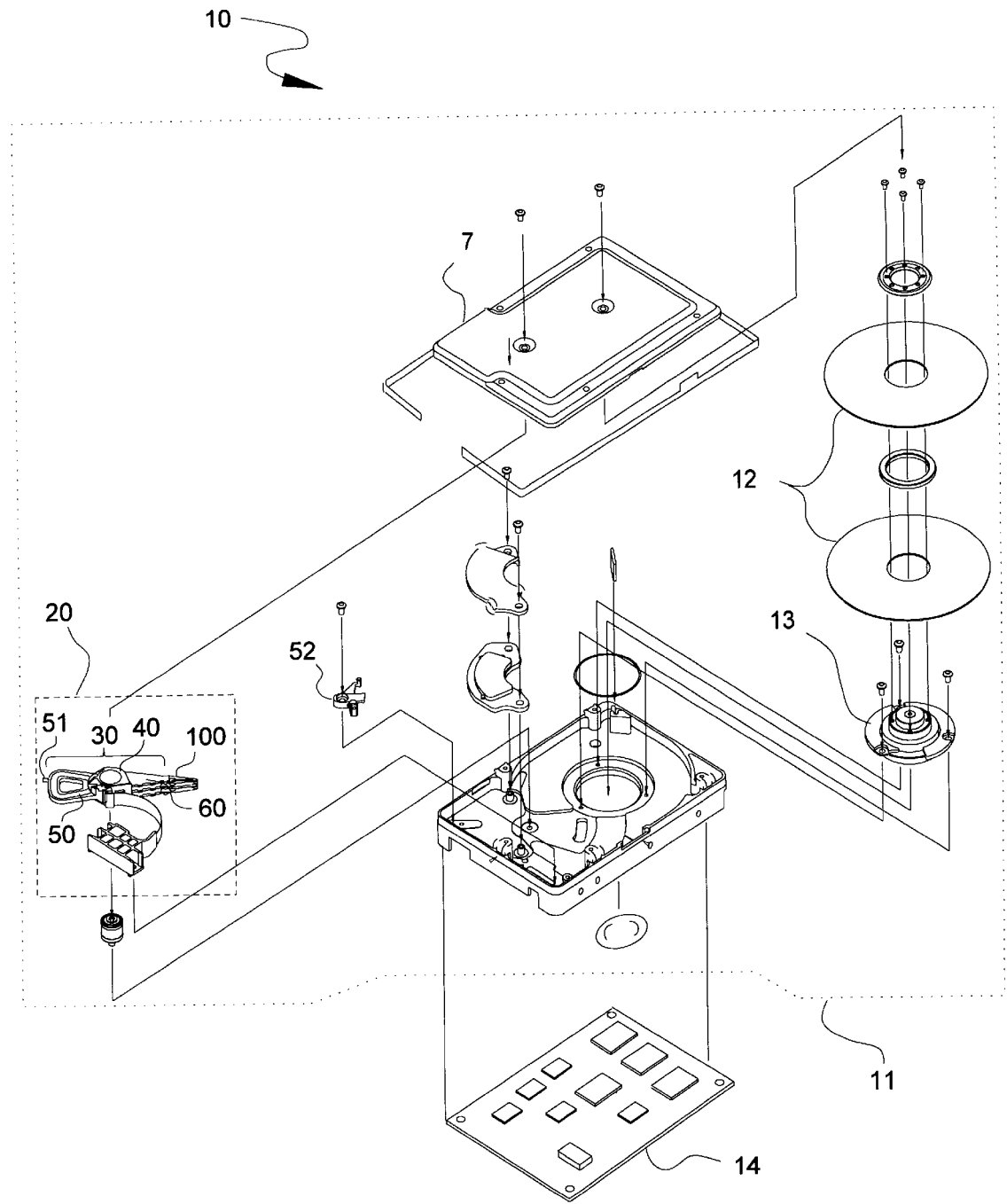
FIG. 1 is an exploded perspective view of a magnetic disk drive 10 having a head disk assembly 11 ("HDA") including a head stack assembly 20 ("HSA") having a mass balanced head gimbal assembly ("HGA") 100 according to the present invention.

FIG. 1 shows the principal components of a disk drive 10 constructed in accordance with the present invention. The disk drive 10 shown is an integrated drive electronics (IDE) drive, comprising a head disk assembly (HDA) 11 and a controller circuit board 14.

The HDA 11 of FIG. 1 comprises a magnetic disk 12 (2 shown), a spindle motor 13 for rapidly rotating the disk 12, and a head stack assembly 20 located next to the disk 12. The head stack assembly 20 shown comprises a swing-type actuator assembly 30 that has at least one head gimbal assembly 100 that, as shown in FIG. 3, comprises a load beam assembly 120 that supports a gimbal 130 that carries a head 140. The head 140 generally comprises a slider 141 that contains at least one transducer 142.

The actuator assembly 30 comprises a voice coil 50, an actuator body 40, and an actuator arm 60. This particular voice coil 50 carries a tang 51 that engages a crash stop 52 during power down. The head gimbal assembly 100 is cantilevered from the actuator arm 60 so that the head 140 is held over the disk 12. The HDA's storage capacity may be increased, as shown in FIG. 1, by including several disks 12 and a head stack assembly 20 having a vertical "stack" of head gimbal assemblies 100 and associated heads 140 for each surface of each disk 12, the head gimbal assemblies 100 supported by multiple actuator arms 60.

The invention makes use of a simple rule of physics—one of balancing mass around a pivot. A load beam can be viewed as a rigid arm that pivots on a hinge at its base. This invention resides in a mass balanced HGA wherein the load beam extends past the hinge to form a load beam balancing member in order to provide or carry a balancing mass on the other side of the hinge axis. There are many possible embodiments.

The ideal hinge for this application allows rotation about the transverse axis "A" of the hinge, but is otherwise "very stiff" so that the load beam balancing member does not affect suspension resonance.

Figure 2:
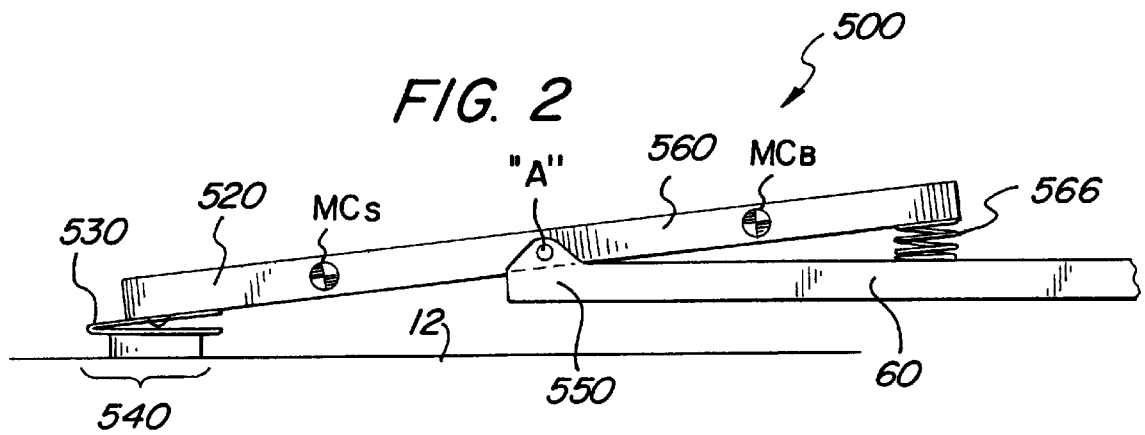
FIG. 2 is a conceptual diagram of a mass balanced HGA 500 having a stiff pin hinge 550 which pivotally supports an extended, mass balanced load beam comprising a load beam 520 and a balancing member 560.

FIG. 2, for example, conceptually shows an HGA 500 comprising a load beam 520 that carries a head 540 via a gimbal 530, a balancing member 560, and a very stiff pin hinge 500 connecting the load beam 520 and balancing member 560 to the actuator arm 60. A compression spring 566 provides the gram load biasing force or pre-load via the balancing member 560.

Figure 2A:
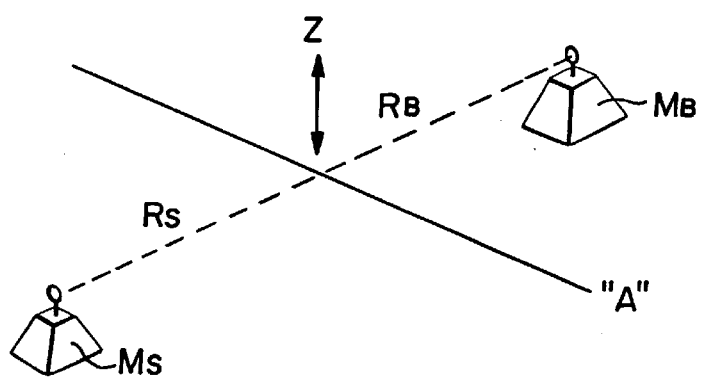
FIG. 2A is a schematic diagram corresponding to the mass balanced HGA 500 of FIG. 2 showing that the suspension mass center $M_S$ located at particular suspension radius $R_S$ from the pivot axis "A" is balanced by a substantially equal balancing mass center $M_B$ located at a substantially equal balancing radius $R_B$.

FIG. 2A shows how the HGA 500 of FIG. 2 is mass balanced. As suggested therein, the load beam 520, the gimbal 530, the slider 540, and the electrical interconnect (not shown) have a combined suspension mass $M_S$ with a suspension mass center $MC_S$ located at a radius $R_S$ from the axis "A." Likewise, the load beam balancing member 560 has a balancing mass $M_B$ with a balancing mass center $MC_B$ located at a radius $R_B$ from the axis "A." In this case, the material which forms the load beam 520 and the load beam balancing member 560 provides the balancing mass $M_B$ such that the suspension mass $M_S$ is approximately equal to the balancing mass $M_B$. If the product of the balancing mass center $MC_B$ and balancing radius $R_B$ is substantially equal to the product of the suspension mass center $MC_S$ and the suspension radius $R_S$, then the HGA is mass balanced around the pivot axis "A". If this is achieved, then linear acceleration in the vertical Z direction (normal to the surface of the disk 12) acts on both the suspension mass $M_S$ and the balancing mass $M_B$ resulting in no torque to lift the head 540 and therefore, no head disk separation or head slap. Theoretically, the mass balanced HGA 500 of FIG. 2 could withstand an infinite Z-direction shock provided that the disk and arm move in unison and assuming rigid body mechanics.

The mass balanced HGA 500 of FIG. 2 may offer other advantages due to the balancing member 560. A separate spring 566, for example, can uniquely apply the pre-load to the head 540 via the load beam balancing member 560. This could allow greater design flexibility by allowing more room for the springs or even allowing the spring to be installed after the heads are loaded on the disk.

A very stiff hinge like the pin hinge 550 of FIG. 2 is ideal for a mass balanced suspension, but it is possible to mass balance an HGA that resembles a more traditional sheet metal suspension that has a softer "flexure hinge" or spring hinge. Flexure hinges are relatively soft in the Z-direction because they also function as a spring and provide the pre-load. For optimum performance, however, the hinge should be as stiff as possible in "Z", yaw, and torsion.

Figure 4:
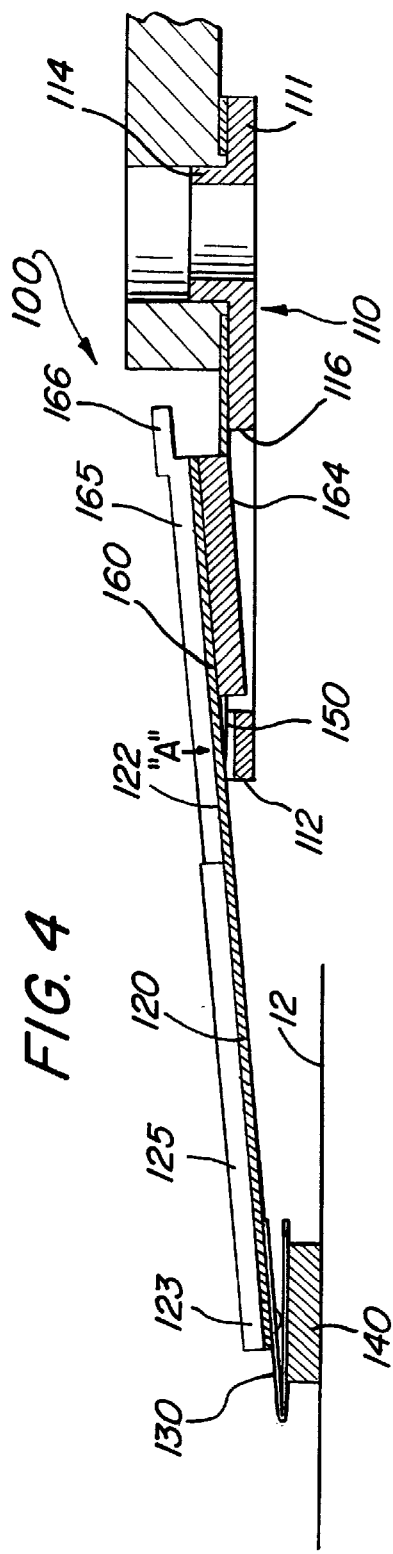
FIG. 4 is a cross-sectional view of the HGA 100 of FIG. 3 taken along section lines 4—4.

FIGS. 3 and 4, for example, show a preferred head gimbal assembly 100 according to the present invention. As shown, the preferred HGA 100 comprises a base plate 110 with a swaging boss 114 or other means for connecting to the actuator arm 60, a load beam 120 which pivots about an axis "A" at a load beam hinge end 122 on hinge members 150, a gimbal 130 supported at a load beam gimbal end 123 of the load beam 120, and a head 140 supported by the gimbal 130. The load beam 120 extends beyond the hinge members 150 to form a balancing member 160 that pivots in opposition to the load beam 120. The preferred balancing member 160 is centrally located and supports a discrete counterweight or balancing mass 164. The balancing member 160 should be as narrow as possible to reduce the effect of the extra balancing mass 164 on torsional vibration that is relevant when the coil 50 engages the crash stops 52 at power down, when seeking and settling, and while track following. The preferred balancing mass 164 is formed from stamped stainless steel, like the base plate 110, and is welded or otherwise attached to the balancing member 160 as best shown by FIG. 4.

The base plate 110 must accommodate the motion of the balancing member 160. The preferred base plate 110 is stamped to form an opening 116 between a rear portion 111 and a front portion 112 that preferably carries a notch 113 to reduce its thickness. The notch 113 and the opening 116 accommodate the movement of the load beam balancing member 160 and the balancing mass 164. The balancing member 160 may optionally include tabs or "limiters" 166 that contact the base plate 110 and mechanically limit the movement of the load beam 120 in a direction away from the disk 12.

The load beam 120 and the load beam balancing member 160 are preferably formed from a thin sheet of stainless steel as commonly used in conventional HGAs. Accordingly, rails 125, 165 are preferably formed in the load beam 120 and the balancing member 160 to provide rigidity. The load beam rails 125 are not continuous with the balancing member rails 165. Accordingly, at least one rib or ridge 126 may be formed across the transverse axis "A" of the hinge members 150 to provide a rigid interface between the load beam 120 and the balancing member 160.

FIG. 3A shows how the HGA 100 of FIG. 3 is mass balanced. As suggested therein, the load beam 120, the gimbal 130, the slider 140, and the electrical interconnect (not shown) have a combined suspension mass $M_S$ that acts through a center of mass $MC_S$ located at a particular radius $R_S$ from the pivot axis "A". Likewise, the load beam balancing member 160 and counterweight 164 have a combined balancing mass $M_B$ with a mass center $MC_B$ located at a particular radius $R_B$ from the pivot axis "A". Here, $M_B > M_S$ and $R_B < R_S$. Nonetheless, so long as the balancing mass $M_B$ multiplied by the balancing radius $R_B$ is equal to the suspension mass $M_S$ multiplied by the suspension radius $R_S$, i.e. as long as $M_S \cdot R_S = M_B \cdot R_B$, then the suspension is mass balanced around the pivot axis "A."

Figure 5A:
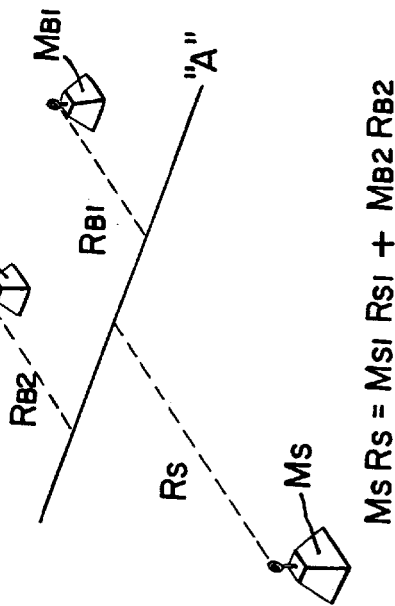
FIG. 5A is a schematic diagram corresponding to the mass balanced HGA 200 of FIG. 5 showing that the suspension and balancing mass centers $M_S$, $M_{B1}$, and $M_{B2}$ are located at respective distances $R_S$, $R_{B1}$, and $R_{B2}$ from the pivot axis "A" such that $M_S*R_S=M_{B1}*R_{B1}+M_{B2}*R_{B2}$.
Figure 5:
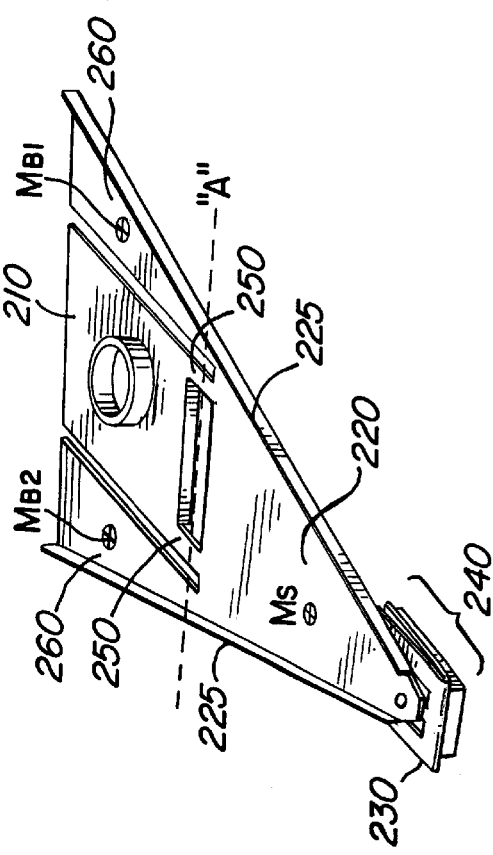
FIG. 5 is a perspective view of a mass balanced HGA 200 wherein the balancing member comprises two wings 260 with balancing mass centers $M_{B1}$ $M_{B2}$ located on either side of the base plate 210.

FIG. 5 shows an alternative sheet metal suspension having a head gimbal assembly 200 that incorporates a traditional base plate 210 and a sheet metal load beam 220 having flexure hinges 250. Here, however, the load beam 220 has been extended to form a pair of load beam balancing members or "wings" 260 that extend back beyond the hinge members 250 on either side of the base plate 210. The rails 225 normally formed on the load beam 220 preferably extend continuously past the hinge members 250 and onto the load beam balancing members 260 in order to provide a rigid interface between the load beam 220 and balancing members 260. As suggested by FIG. 5A, the mass is balanced around the hinge center "A" by making the sum of the mass/radius products of the wings 260 substantially equal to the mass/radius product of the suspension (load beam 220, gimbal 230, slider 240, and electrical interconnect).

Figure 6:
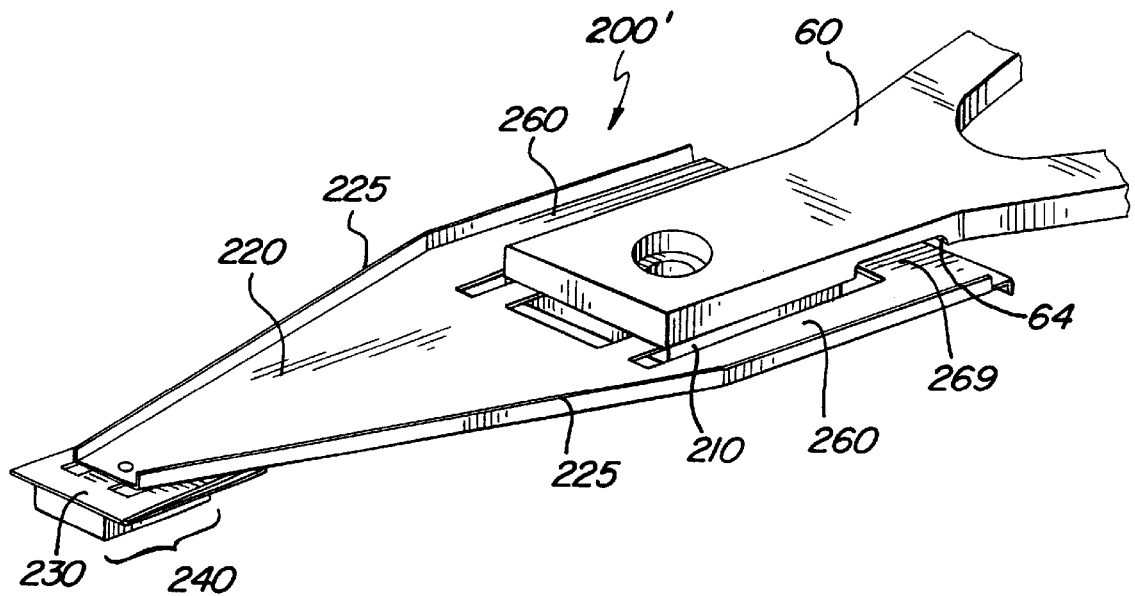
FIG. 6 is a perspective view of an alternative mass balanced HGA 200' similar to that of FIG. 6 except that the wings 260 are relatively narrow and connected together by a cross-member 269' which moves within a notch 64 in the actuator arm 60.
Figure 7:
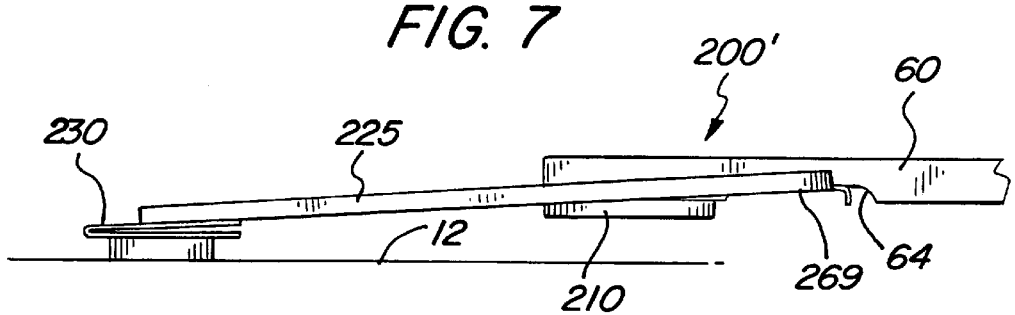
FIG. 7 is a side view of the mass balanced HGA 200' of FIG. 6.

The FIG. 5 design could still be improved. First, because the wings 260 are positioned relatively far from the torsional center of rotation because they extend along either side of and beyond the edges of the base plate 210 and the actuator arm 60, and because the hinge members 250 are not very stiff in Z and torsion (like the pin hinge 550 of FIG. 2), the wings 260 will dramatically decrease the torsional resonance frequency. Finally, the individual wings 260 are not very stiff if cantilevered as shown. Accordingly, in order to reduce vibration issues, it may be advantageous to narrow the wings 260 using formed rails 225 and connect the wings together around the back of the base plate with a cross-member 269 as shown in FIGS. 6 and 7. It may be necessary to provide a notch 64 in the actuator arm 60 to accommodate the movement of the cross-member 269, or conversely the cross-member could be formed to provide clearance if necessary.

A mass balanced HGA may provide very significant improvement in seeking and settling. Present suspensions have a mass with a moment arm suspended beyond the hinge. When the actuator stops, a moment is applied to the hinge. With a mass balanced suspension, there is no moment, only a shear force. This could improve the seek and settle performance and the track following performance because there would be no or little moment and lateral gain should be very low.

A mass balanced HGA would also improve system performance with respect to shock in the lateral direction. An impact with the crash stop 52, for example, would cause less "ringing" of the suspension since the mass is also balanced about an axis normal to the disk surface centered on the hinge's transverse axis "A". In a rotary swing-type actuator, however, because the balancing mass $M_B$ is located closer to the actuator's swing axis than is the suspension mass $M_S$, it may be desirable to slightly increase the balancing mass $M_B$ to counteract the angular acceleration torque as well.

A disk drive may be generally analyzed with rigid body mechanics as above, but it obviously is not a true rigid body. In particular, a shock event will cause the actuator arm 60 and disk 12 to independently move relative to the overall drive 10 as suggested by the spring-mass diagram of FIG. 8. A further, very important consideration, therefore, is that the disk 12 and the actuator arm 60 will move during a shock event.

The relative motion of the disk and arm needs to be considered. In particular, the disk 12 and the arm 60 may move in different magnitudes and be either in phase or out of phase relative to one another. An initial shock to the disk drive is likely to make the disk 12 and arm 60 to move together. However, because the disk 12 and the arm 60 will oscillate at different response frequencies, they will move out of phase relative to one another as the initial shock dissipates from the system.

Disk movement is generally more significant than arm movement. Accordingly, as shown in FIGS. 8A and 8B, we can simplify the analysis by assuming that the arm 60 has a rigid body connection with the remainder of the drive 10 and thereby ignore arm movement. The exact specifications will vary from drive to drive, but the disk 12 in a typical drive generally moves up and down in a sinusoidal mode of about 400 Hz to 600 Hz in response to a shock event.

A mass balanced HGA according to the present invention will reduce the likelihood of head slap where the disk 12 and the arm 60 move together (in phase) from the initial shock. However, when the disk 12 and the arm 60 are moving in different proportions or even worse, in opposite directions, the relatively massive disk 12 may effectively throw or launch the suspension from its surface. The ease with which the HGA (suspension and slider) is thrown from the disk 12 is proportional to the HGA's rotational inertia generally defined as $Mr^2$ or, in this particular case: $M_B \cdot R_B^2 + M_S \cdot R_S^2$. The additional balancing mass $M_B$ located at a particular radius $R_B$ used to prevent head slap from in-phase movement, will increase the rotational inertia of the HGA and make it more susceptible to head slap due to disk and arm motion.

A first level solution to the launching problem caused by disk and arm movement is to reduce the rotational inertia of the mass balanced HGA. As noted above, rotational inertia is proportional to the mass and to the square of the radius. Accordingly, in order to reduce susceptibility to head slap from disk and arm movement, we can reduce the rotational inertia of the mass balanced HGA by using a larger balancing mass $M_B$ at a smaller radius $R_B$ from the hinge axis "A."

A more sophisticated approach to the problem of disk and arm movement is to design the load beam balancing member so that it will bend during a shock event in such a manner that it will oscillate in opposition to the disk.

Figure 9:
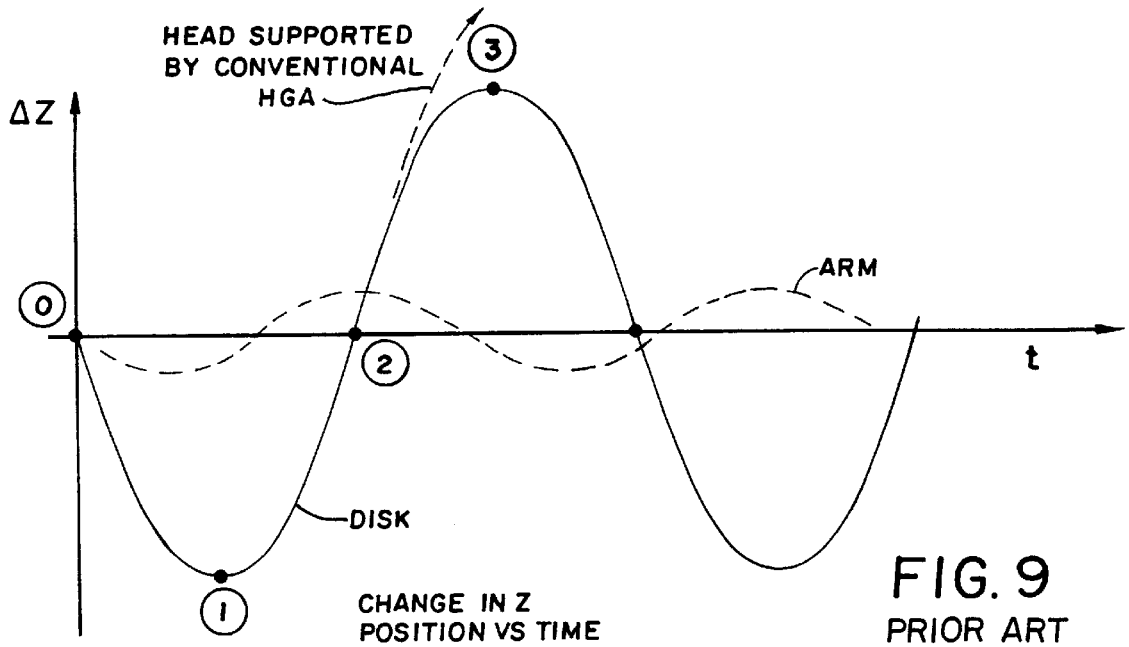
FIG. 9 is a graph showing the displacement of the disk 12, the actuator arm 60, and a head supported by a conventional HGA with positions (0), (1), (2) and (3) labeled in correspondence with FIG. 8A.

FIG. 9 shows the relative motion of the disk, the actuator arm, and the head following a shock event with a conventional HGA. With reference to FIG. 8A, and given a downward facing HGA, we see that the head will travel with the disk 12 as it moves downward from position (0) to position (1) and then upward through position (2). However, as the disk 12 moves toward its positive apex (3) it carries the head with it. When the disk 12 begins to decelerate, the HGA continues to move due to its rotational inertia such that it separates from the disk 12. The motion of the actuator arm 60 may be relatively small as shown in FIG. 9 such that we can assure a rigid body connection between it and the drive 10. Nonetheless, the arm 60 may move out of phase with the disk 12 and contribute to the launch event.

Figure 10:
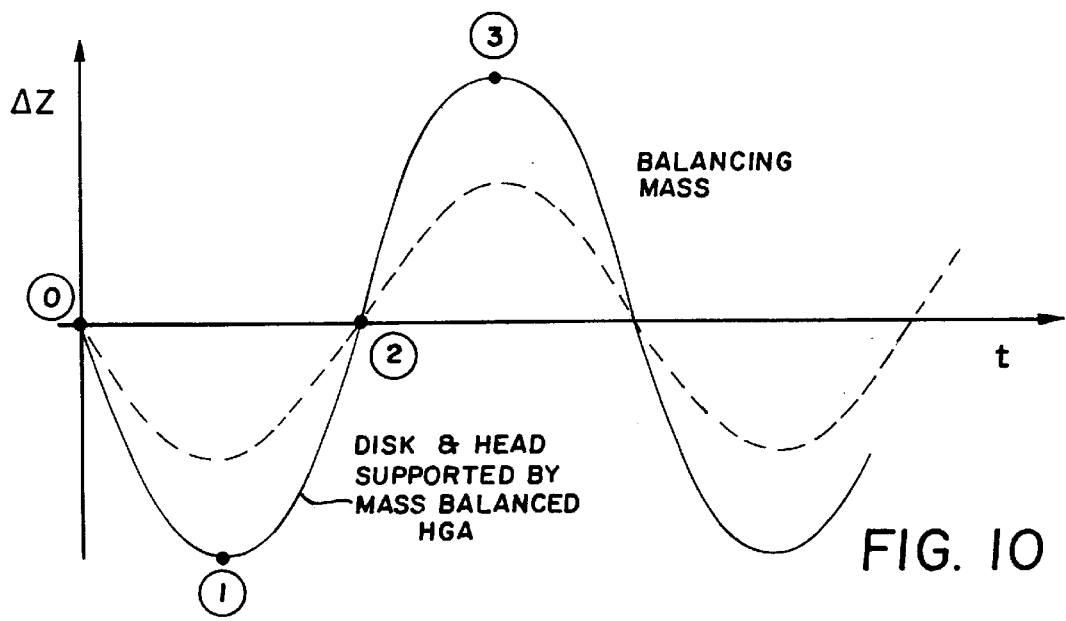
FIG. 10 is a graph showing the displacement of the disk 12, the balancing mass $M_B$, and a head supported by a mass balanced HGA according to the present invention with positions (0), (1), (2) and (3) labeled in correspondence with FIG. 8B.
Figure 11:
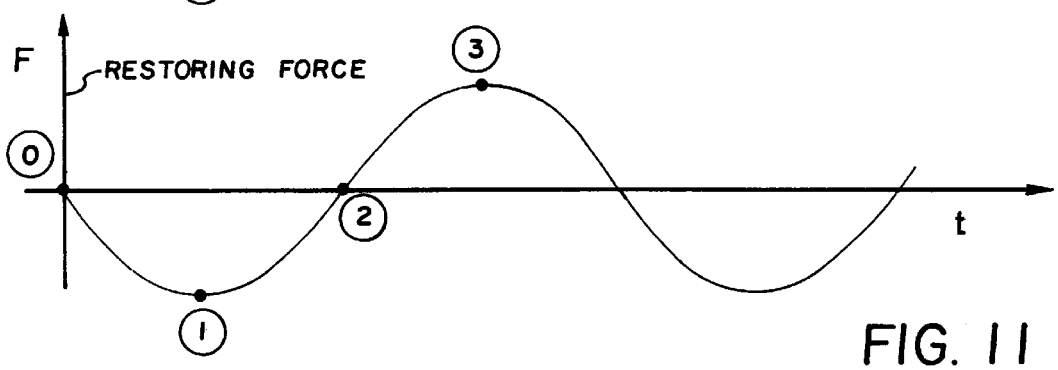
FIG. 11 is a graph showing the restoring force generated by the balancing mass $M_B$ which pushes the head into the disk 12 in correspondence with FIG. 10.

The extended load beam of the present invention can be modified to counteract the harmonic motion of the disk 12. In particular, as suggested by FIGS. 9B, 10 and 11, the load beam balancing member may uniquely interact with a spring means 170 to form a tuned damper that oscillates in opposition to the disk 12 in response to a shock event. An upward acceleration corresponds to position (0) while a downward acceleration corresponds to position (2) as a starting point for the cycle indicated. In either case, the opposing motion of the balancing member would provide a restoring force to the head, as shown in FIG. 11, that tends to make the head hug the surface of the oscillating disk 12. The restoring force needs to be sufficiently large so that force created by the disk's acceleration and the HGA's rotational inertia never exceeds the pre-load force and the restoring force applied by the balancing member.

Figure 12:
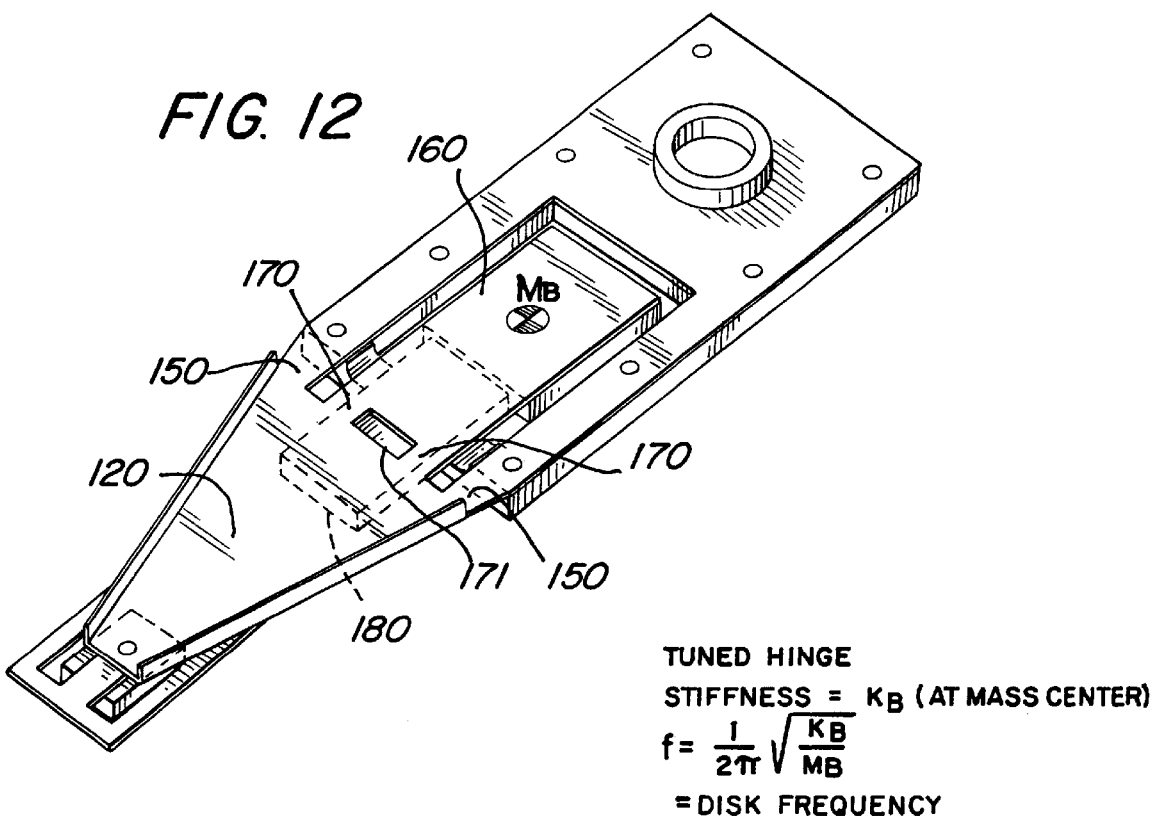
FIG. 12 is a perspective view of an alternative mass balanced HGA 100' similar to that of FIG. 3 except that the strengthening ribs 126 have been replaced by a notch 171 which helps define a spring hinge 170 that flexibly supports the balancing member 160 to form a "tuned damper" system like that shown in FIG. 8.

There are several ways to form a tuned damper with the balancing member. The preferred embodiment of FIG. 3 may be modified as shown in FIG. 12, for example, wherein the stiffening ribs 126 have been omitted so that the interface between the load beam 120 and the balancing member 160 is flexible and a cutout 170 has been provided to form balancing member spring hinges 170 that are substantially coaxial with the pre-load spring hinges 150. The stiffness of the spring hinges 170 taken at the mass center of the balancing mass $M_B$ may be described with a spring constant $K_B$. This spring constant $K_B$ may be varied, of course, by varying the thickness of the material forming the load beam 120 and balancing member 160, by varying the geometry of the cutout 171, or both. Accordingly, we can set the spring constant $K_B$ such that the harmonic frequency of the balancing member 160 closely matches the disk frequency, using the well known equation:

$$f = \frac{1}{2\pi}\sqrt{\frac{K_B}{M_B}}$$

A further refinement would entail a means for damping the harmonic oscillation of the HGA's balancing member. This could be accomplished as shown by dashed lines in FIG. 12, for example, by laminating a viscous pad 180 onto the load beam 120 and balancing member 160 and across the spring hinges 170. The damping rate of the balancing member 160 should substantially match the damping rate of the disk.

Figure 13:
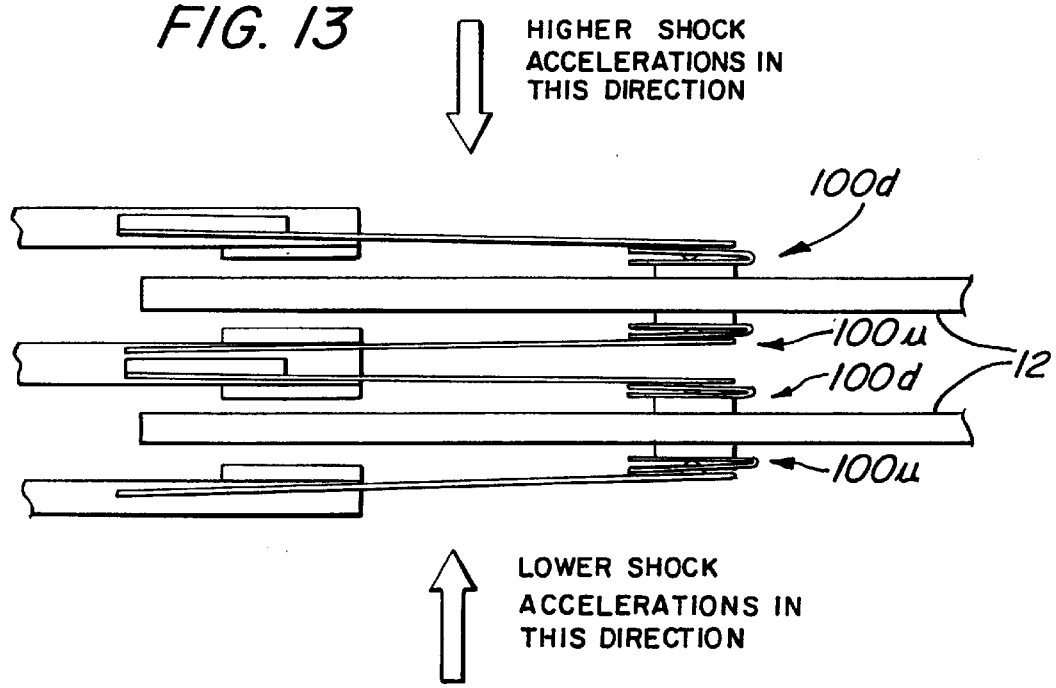
FIG. 13 is a schematic view of a pair of up HGAs 100$u$ and a pair of down HGAs 100$d$ supported adjacent a pair of disks 12 wherein the mass*radius product $M_B*R_B$ of the down HGAs 100$d$ is larger than the mass*radius product $M_S*R_S$ of the up HGAs 100$u$ in order to counteract a downward shock acceleration.

Finally, it may be desirable in some instances to design a mismatched system wherein $M_S R_S\ M_B R_B$. In particular, the mass center could be biased to drive the head toward the disk given an acceleration $\ddot{Z}$ in a particular direction. For example, $M_B R_B$ could be made larger than $M_S R_S$, for example, so that a downward acceleration $\ddot{Z}$ which causes an upward translation $\Delta Z$ of the hinge will drive the head toward the disk 112. FIG. 13 shows a head stack assembly comprising a plurality of down HGAs 100d and up HGAs 100u that may benefit from this modification so long as the drive is characterized by higher shock induced accelerations in one direction than another. Here, the balancing mass of down HGAs 100d is made more massive than that of the up HGAs 100u in order to drive the down HGAs 100d into the disks given a downward acceleration.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A magnetic disk drive having a disk and a head stack assembly, the disk including a plurality of recording surfaces, the head stack assembly having a coil, an actuator body, an actuator arm, and a plurality of head gimbal assemblies, each head gimbal assembly comprising:

a transducer head for flying above a respective one of the recording surfaces of the disk while reading magnetic data recorded on the respective surface of the disk;

a gimbal means for supporting the transducer head;

electrical interconnect means for carrying signals to and from the transducer head; and a mass balanced load beam assembly comprising a multi-portion member and a balancing mass;

the multi-portion member comprising:

a base portion having a base actuator end joined to the actuator arm and a base hinge end;

a flexure hinge portion defining a transverse axis;

an elongated load beam portion having a load beam hinge end joined to the base hinge end via the flexure hinge means and a load beam gimbal end joined to the gimbal means; and a load beam balancing portion having the balancing mass affixed to it, and being connected to the elongated load beam portion to extend toward the base portion such that the elongated load beam portion and the load beam balancing portion pivot in opposition to each other about the transverse axis of the flexure hinge portion.

2. The magnetic disk drive of claim 1 wherein the elongated load beam portion and attached components, including the transducer head, the gimbal means, and the electrical interconnect means, form a suspension mass $M_S$ with a suspension mass center that is at a distance $R_S$ from the transverse axis; and wherein the balancing portion and affixed balancing mass form a balancing mass $M_B$ having a balancing mass center that is a distance $R_B$ from the transverse axis.

3. The magnetic disk drive of claim 2 wherein $M_B*R_B$ is substantially equal to $M_S*R_S$ whereby an acceleration in the Z-direction normal to a disk recording surface is less likely to cause a head-disk separation and subsequent head slap because a torque generated by the balancing mass $M_B$ at a distance $R_B$ substantially counteracts a torque generated by the suspension mass $M_S$ at a distance $R_S$.

4. The magnetic disk drive of claim 1 further comprising a means for limiting a movement of the elongated load beam portion about the flexure hinge portion in order to limit a separation between the transducer head and the disk.

5. The magnetic disk drive of claim 1 further comprising means for limiting the movement of the load beam balancing portion.

6. The magnetic disk drive of claim 5 wherein the means for limiting the movement of the load beam balancing portion comprises a tab which extends from the load beam balancing portion and contacts the base portion.

7. A mass balanced load beam assembly for attachment to an actuator arm and for carrying a gimbal-supported flying-head transducer head with associated electrical interconnect means, the load beam assembly comprising:

a multi-portion member, a balancing mass, and a gimbal means for supporting the flying-head transducer head;

the multi-portion member including:

a base portion having a base actuator end and a base hinge end;

a flexure hinge portion defining a transverse axis;

an elongated load beam portion having a load beam hinge end and a load beam gimbal end, the load beam hinge end joined to the base hinge end via the flexure hinge portion;

the gimbal means being attached to the load beam gimbal end; and a load beam balancing portion having the balancing mass affixed to it, and being connected to the elongated load beam portion to extend toward the base portion such that the elongated beam portion and the load beam balancing portion pivot in opposition to each other about the transverse axis of the flexure hinge portion.

8. The mass balanced load beam assembly of claim 7 wherein the elongated load beam portion and the load beam balancing portion are formed from a common sheet.

9. The mass balanced load beam assembly of claim 8 wherein the common sheet is stainless steel.

10. The mass balanced load beam assembly of claim 8 wherein elongated load beam portion has elongated edges that are bent to form respective stiffening rails.

11. The mass balanced load beam assembly of claim 8 wherein the common sheet includes a rib that extends across the transverse axis of the flexure hinge portion to rigidly connect the load beam balancing portion to the elongated load beam portion.

12. The mass balanced load beam assembly of claim 7 wherein the load beam balancing portion comprises a centrally located balancing member.

13. The mass balanced load beam assembly of claim 12 wherein the base portion includes an aperture between its base actuator end and its base hinge end and wherein the centrally located balancing member moves within the aperture as it pivots about the transverse axis of the flexure hinge portion.

14. The mass balanced load beam assembly of claim 12 wherein the elongated load beam portion and the load beam balancing portion are formed from a common sheet.

15. The mass balanced load beam assembly of claim 14 wherein the common sheet is stainless steel.

16. The mass balanced load beam assembly of claim 14 wherein the elongated load beam portion has elongated edges that are bent to form respective stiffening rails.

17. The mass balanced load beam assembly of claim 16 wherein the stiffening rails of the load beam balancing member extend so as to contact the base portion of the load beam assembly and thereby limit a motion of the load beam balancing member.

18. The mass balanced load beam assembly of claim 14 wherein the common sheet includes a rib that extends across the transverse axis of the hinge means to help rigidly connect the load beam balancing member to the load beam.

19. The mass balanced load beam assembly of claim 7 wherein the hinge means comprises a flexure hinge.

20. The mass balanced load beam assembly of claim 7 further comprising a means for limiting a movement of the elongated load beam about the hinge means.

21. The mass balanced load beam assembly of claim 20 wherein the means for limiting the movement of the elongated load beam comprises a means for limiting the movement of the load beam balancing member.

22. The mass balanced load beam assembly of claim 21 wherein the means for limiting the movement of the load beam balancing member comprises a tab which extends from the load beam balancing member and contacts the base portion of the load beam assembly.

23. A head stack assembly for a magnetic disk drive having a disk including a plurality of recording surfaces, the head stack assembly comprising:

an actuator body having a pivot axis;

a motive means for swinging the actuator body about the pivot axis;

a plurality of arms cantilevered from the actuator body; and a plurality of mass balanced load beam assemblies attached to the actuator arms, each mass balanced load beam assembly carrying a gimbal-supported transducer head with associated electrical interconnect means, each transducer head for flying above a respective one of the recording surfaces of the disk while reading data recorded thereon, each mass balanced load beam assembly comprising a multi-portion member, a balancing mass, and a gimbal means for supporting the flying-head transducer head, the multi-portion member comprising:

a base portion having a base actuator end and a base hinge end;

a flexure hinge portion defining a transverse axis;

an elongated load beam portion having a load beam hinge end and a load beam gimbal end, the load beam hinge end joined to the base hinge end via the hinge means;

the gimbal means being attached to the load beam gimbal end; and a load beam balancing portion having the balancing mass affixed to it and being connected to the elongated load beam portion to extend toward the base portion such that the elongated load beam portion and the load beam balancing portion pivot in opposition to each other about the transverse axis of the flexure hinge portion.

24. The head stack assembly of claim 23 wherein the elongated load beam portion and attached components, including the transducer head, the gimbal means, and the electrical interconnect means, form a suspension mass $M_S$ with a suspension mass center that is at a distance $R_S$ from the transverse axis; and wherein the balancing portion and the affixed balancing mass form a balancing mass $M_B$ having a balancing mass center that is a distance $R_B$ from the transverse axis.

25. The head stack assembly of claim 24 wherein $M_B*R_B$ is substantially equal to $M_S*R_S$ whereby an acceleration in the Z-direction normal to a disk recording surface is less likely cause a head disk separation and subsequent head slap because a torque generated by the balancing mass $M_B$ at a distance $R_B$ substantially counteracts a torque generated by the suspension mass $M_S$ at a distance $R_S$.

26. The head stack assembly of claim 23 wherein each mass balanced load beam assembly further comprises a means for limiting a movement of the elongated load beam portion about the flexure hinge portion.

27. The head stack assembly of claim 26 wherein the means for limiting a movement of the elongated load beam portion about the flexure hinge portion comprises a means for limiting the movement of the load beam balancing portion.

28. The head stack assembly of claim 26 wherein the means for limiting the movement of the load beam balancing portion comprises a tab which extends from the load beam balancing portion and contacts the base portion of the load beam assembly.

* * * * *